UNITED STATES PATENT OFFICE.

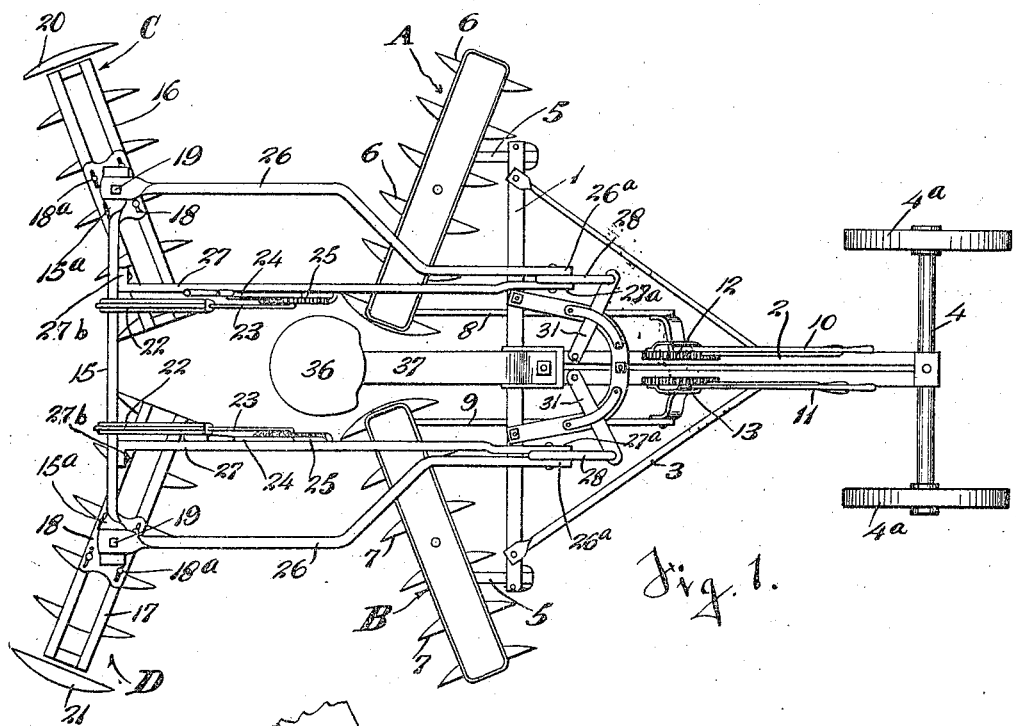
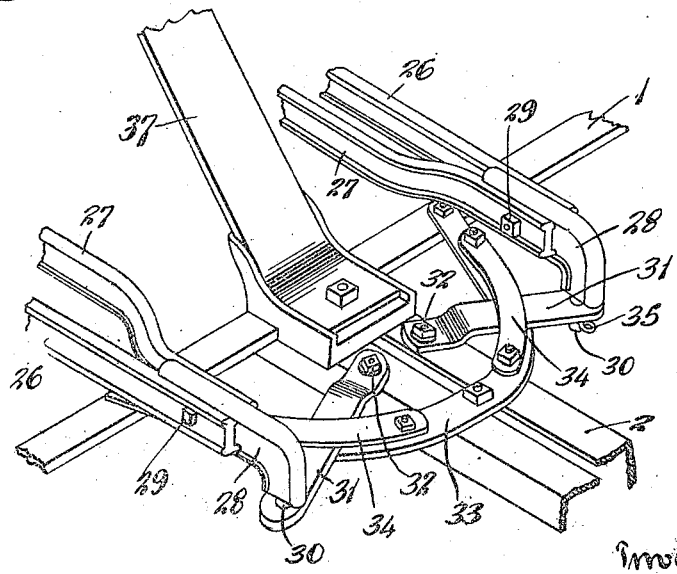
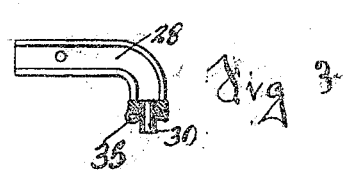

JAMES H. IMUS, OF DAYTON, OHIO.

DISK HARROW.

1,156,843. Specification of Letters Patent. Patented Oct. 12, 1915.

Application filed May 27, 1915. Serial No. 30,723.

*To all whom it may concern:*

Be it known that I, JAMES H. IMUS, a citizen of the United States, and a resident of the city of Dayton, in the county of Montgomery and State of Ohio, have invented certain new and useful Improvements in Disk Harrows, of which the following is a full, clear, and exact description, reference being had to the accompanying drawings, forming part of this specification.

My invention relates to disk harrows of the four gang type, wherein the sets or the gangs of harrow disks or cutters are arranged two at the front and two at the rear of the implement, and wherein the gangs are set at an angle to the line of draft so that the forward set may work away from the line and the rearward set toward said line of draft.

It is customary in the art to couple the rearward and the forward set of gangs together in tandem in such harrows, and in some harrows the gangs are held in a fixed but partially flexible frame.

It is the object of my invention to provide coupling means for the rear set of gangs to the short tongue of such implements, such that the rear gangs will be well braced and uniformly drawn in proper tracking with the forward gangs and yet be pivotally mounted to the forward framework so as to take corners without over running or digging a hole. This I accomplish by that certain construction and arrangement of parts to be hereinafter more specifically pointed out and claimed.

In the drawings, Figure 1 is a top plan view of the harrow. Fig. 2 is a perspective view of the rear gang pivoting couplers. Fig. 3 is a detail section of the pivot of one of the side bars.

At the front of the frame is a transverse bar 1 which is suitably bolted to the short tongue 2 of the implement and braced thereto by means of the side braces 3, 3. The short tongue is supported in front on the axle 4 of the carrying wheels $4^a$, $4^a$, as is customary in the art. The two front gangs A and B of the harrow are pivotally mounted in the usual way in the hangers 5, 5, depending from the ends of the transverse bar 1. The disk or cutters 6, 6, 7, 7, of the gangs A and B respectively are faced in opposite directions and set so as to throw the soil away from the line of draft at both sides of the implement.

The gangs are held in angular position to the line of draft adjustably as desired by means of the connecting bars 8, 9, which are connected to the gang frames at their rear end and to the usual hand levers 10, 11, at the forward end. These levers are pivoted on the sides of the short tongue and provided with the usual notched segments 12, 13, which coöperate with any desired form of latch to hold the levers in any desired position. At the rear of the implement is a transverse frame bar 15, preferably a metal bar disposed edgewise, but given a quarter turn at the ends to form flat horizontal portions $15^a$, $15^a$. The two rear gangs of disks C and D are pivotally secured to these ends of the transverse bar 15, their frames 16 and 17 respectively being provided with coupling plates 18 for this purpose. These plates have a bolt and slot connection $18^a$ with the frames so as to permit of lateral adjustment of the said frames, and are coupled to the transverse bar by the pivot bolts 19, 19. The circular disks 20, 21, of the rear gangs are set to throw the dirt inwardly, and the gang frames are held in the desired angular position with relation to the line of draft by means of loops 22, 22, and connecting bars 23, 23, as shown and described in my copending application filed January 7, 1915, Serial No. 896. As in said application, each connecting bar has a pivoted hand lever 24, 24, provided with proper notched segments 25, 25, to engage suitable latches to hold the levers in any desired position.

Secured by means of the pivot bolts 19, 19, to the ends of the transverse bar 15, are the side bars 26, 26, of the rear framework. There are also side bars 27, 27, bolted at $27^b$, to the transverse bar 15. These bars 26 and 27 are preferably channel bars, and the bars 26 are bent toward the center of the implement so as to bring their ends $26^a$ adjacent to the ends $27^a$ of the inner side bars 27. These bars are of a length to reach beyond the front frame of the transverse bar 1 and are bolted together with the stout coupling bars 28, 28, between them by means of bolts 29, 29.

The coupling bars 28 bend downwardly and at their ends are provided with pivot pins 30, 30, which pass through apertures in the ends of the bars 31, 31. These bars 31 are pivotally secured at 32 to the short tongue of the implement and they are preferably formed of flat pieces of iron and provided with raceways by means of a U-shaped bar 33 which is rigidly secured to the short tongue and to the transverse bar 1, said U-shaped piece having the brace bars 34, 34, mounted on its upper face. The pivotal connection of the coupling pieces 28 with the bars 31 is held against jarring loose by cotter pins 35, 35. The implement is provided with the usual driver's seat 36, mounted centrally on the front portion of the frame by means of the bar 37.

The framework for the rear gangs can be easily separated from the rest of the implement so as to make a single harrow by uncoupling the coupling bars 28.

When turning a corner in operating the harrow, it is evident that the framework for the rear gangs can easily and without digging, follow after the forward gangs. In accomplishing a turn, there is pivotal connection both at the pivot pins 30 and at the pivot bolts 32 for the pivoted bars. There is provided, in the raceway, ample protection against rocking out of position of either of the pivoted bars, and it seems clear that the construction shown allows, in turning, a forward movement at one side of the rear gangs, at the same time that a rearward movement is being made at the other side of the gangs. The double side bar construction 26, 27, provides ample bracing to hold the rear gangs steady during a straightforward driving of the implement. The raceways also limit the movement of the pivoted bars 31 so that they will not swing too far forwardly or rearwardly.

Having thus described my invention, what I claim as new and desire to secure by Letters Patent, is:—

1. In a disk harrow, a front and a rear frame portion, each having a pair of disk gangs pivotally mounted thereon on opposite sides of the median line of draft, pivoted members on the front frame, side bars on the rear frame and pivotal connection therefor to the pivoted members, for the purpose described.

2. In a disk harrow, a front and a rear frame portion, each having a pair of disk gangs pivotally mounted thereon on opposite sides of the median line of draft, pivoted members on the front frame, side bars on the rear frame and pivotal connection therefor to the pivoted members at each side of the median line of draft, for the purpose described.

3. In a disk harrow, a front and a rear frame portion, each having a pair of disk gangs pivotally mounted thereon on opposite sides of the line of draft, pivoted bars on the front frame, and coupling bars secured to the rear frame, and pivotally connected to said pivoted bars, for the purpose described.

4. In a disk harrow, a front and a rear frame portion, each having a pair of disk gangs pivotally mounted thereon on opposite sides of the line of draft, pivoted bars on the front frame, coupling bars secured to the rear frame, and pivotally connected to said pivoted bars, and means on the forward frame for retaining the said pivoted bar in proper horizontal position, for the purpose described.

5. In a disk harrow, a front and a rear frame portion, each having a pair of disk gangs pivotally mounted thereon on opposite sides of the line of draft, pivoted bars on the front frame, and forwardly extending members secured to the rear frame, and pivotally connected to said pivoted bars and raceways for said pivoted bars mounted on the forward frame, for the purpose described.

6. In a disk harrow, a front and a rear frame portion, each having a pair of disk gangs pivotally mounted thereon on opposite sides of the median line of draft, the rear frame comprising a transverse bar, and a pair of converging bars on each side of the median line extending from said transverse bar, a pair of pivoted bars on the forward frame, and a pivotal connection between said pivoted bars and the converging members at each side.

7. In a disk harrow, a front and a rear frame portion, each having a pair of disk gangs pivotally mounted thereon on opposite sides of the median line of draft, the rear frame comprising a transverse bar, and a pair of converging bars on each side of the median line extending from said transverse bar, a coupling member on each pair of bars, a pair of pivoted bars on the forward frame and pivotal connection between said pivoted bars and the coupling members.

8. In a disk harrow, a front and a rear frame portion, each having a pair of disk gangs pivotally mounted thereon on opposite sides of the median line of draft, the rear frame comprising a transverse bar, and a pair of converging bars on each side of the median line extending from said transverse bar, a coupling member on each pair of bars, a pair of pivoted bars on the forward frame and pivotal connection between said pivoted bars and the coupling members, and means for retaining said pivoted bars in proper horizontal relation to the frame and limiting the motion thereof.

9. In a disk harrow, a front and a rear frame portion, each having a pair of disk gangs pivotally mounted thereon on opposite sides of the median line of draft, the rear frame comprising a transverse bar, and a pair of converging bars on each side of the median line extending from said transverse bar, a coupling member on each pair of bars, a pair of pivoted bars on the forward frame and pivotal connection between said pivoted bars and the coupling members, a framework mounted on the forward frame, and raceways for said pivoted bars formed on the framework, for the purpose described.

JAMES H. IMUS.